United States Patent [19]
Yonezawa

[11] Patent Number: 5,825,533
[45] Date of Patent: Oct. 20, 1998

[54] TANDEM SCANNING CONFOCAL MICROSCOPE

[75] Inventor: Yasuo Yonezawa, Zushi, Japan

[73] Assignee: Nikon Corporation, Tokyo, Japan

[21] Appl. No.: 869,165

[22] Filed: Jun. 4, 1997

[30] Foreign Application Priority Data

Jun. 4, 1996 [JP] Japan ................................ 8-141448

[51] Int. Cl.⁶ .............................. G02B 21/00; G02B 21/06
[52] U.S. Cl. ........................... 359/372; 359/388; 359/389
[58] Field of Search .................................. 359/372, 388, 359/381, 389, 368; 250/234, 235, 236

[56] References Cited

U.S. PATENT DOCUMENTS 3,926,500  12/1975  Frosch et al. ........................... 359/389
4,927,254   5/1990  Kino et al. .

FOREIGN PATENT DOCUMENTS 4-347801  12/1992  Japan .

7-20383    1/1995  Japan ..................................... 359/368

Primary Examiner—Jon W. Henry
Attorney, Agent, or Firm—Chapman and Cutler

[57] ABSTRACT

A structure that changes from a confocal observation mode to a normal observation mode is made possible while keeping a Nipkow disk in a fixed position. A main optical system includes a confocal illumination light source, a first half mirror, a Nipkow disk, an objective lens, a relay lens and an ocular lens for conducting confocal observation. A bypass optical system includes a normal illumination light source, a second half mirror and first, second and third fully reflective mirrors. The bypass optical system is appended to the main optical system to form the tandem scanning confocal microscope. The first and third fully reflective mirrors can be moved out of and separated from the light path of the main optical system. As a result, with the position of the Nipkow disk fixed, it is possible to change between confocal and normal observation modes.

20 Claims, 3 Drawing Sheets

TANDEM SCANNING CONFOCAL MICROSCOPE

BACKGROUND OF THE INVENTION

1. Field of the Invention

This invention pertains to a tandem scanning confocal microscope and, in particular, to such a confocal microscope with which it is possible to conduct both confocal and normal observation.

2. Description of Related Art

Tandem operation confocal microscopes are widely known for their advantages in terms of high resolution. Previous examples of tandem scanning confocal microscopes include those of U.S. Pat. No. 4,927,254 and Japanese Kokai Patent Application No. Hei 4[1992]-347801.

One kind of previous tandem scanning confocal microscope will be described with reference to FIG. 3. This microscope is constructed by placing, inside a casing, a confocal illumination light source (50), a first half mirror (51), a Nipkow disk (52), an objective lens (53), a relay lens (54) and an eyepiece (55). The Nipkow disk (52) is a rotating disk in which many pinholes (minute holes) are formed in a spiral pattern which spreads out from the center. This disk (52) turns at a high speed and has a shaft (52a) at its center. The microscope also has a normal illumination light source (61) and a second half mirror (62). The microscope is constructed so that confocal observation is conducted by irradiating the observation specimen (65) with the light from the confocal illumination light source (50). Normal observation is conducted by irradiating the observation specimen (65) with light from the normal illumination light source.

The light irradiated from the confocal illumination light source (50) passes through the first half mirror (51), illuminates the Nipkow disk (52) and then passes through the pinholes in the disk (52). The light passing through the pinholes will pass through the second half mirror (62) and, after passing through the objective lens (53), illuminates the observation specimen (65). Here, the pinhole formation surface of the Nipkow disk (52) is placed by the objective lens (53) at the primary image position (focal point (c1)). As a result, the light which passes through the objective lens (53) and is irradiated onto the observation specimen (65) forms a pinhole image on the observation specimen (65). The light which is irradiated onto the observation specimen (65) is reflected by the observation specimen (65) and passes through the objective lens (53) and the second half mirror (62) again. The light comes together at and passes through the original pinhole. The light is then reflected by the first half mirror (51), passes through the relay lens (54), and forms a second image of the observation specimen at a focal point (c2). By observing this second image with the ocular lens (55), confocal observation is possible.

Normal observation can be conducted using illumination from the normal illumination light source (61) as well. For normal observation, the Nipkow disk (52) is either moved to a position away from the light path or removed entirely from the microscope. The light from the normal illumination light source (61) is reflected by the second half mirror (62) to illuminate the objective specimen (65) by way of the objective lens (53). This reflected light is then made to pass through the objective lens (53) and the second half mirror (62), after which it is reflected by the first half mirror (51) and combined into an image at the focal point (c2) by the relay lens (54). As a result, an entire image of the observation objective can be observed through the ocular lens (55).

In the known tandem scanning confocal microscope, it is necessary to insert or remove the Nipkow disk when switching between confocal and normal observation modes. It is also necessary, however, for the Nipkow disk to form the primary image of the observation specimen which passes through the pinholes and is reflected in the same pinhole position. The Nipkow disk must be placed accurately at the focal position. However, in known structures, in which the Nipkow disk is alternately inserted and removed, fluctuations in the positioning of the Nipkow disk tend to occur due to the insertion or removal of the disk. Consequently, it has been difficult to conduct confocal observation accurately.

Furthermore, with structures in which the Nipkow disk is inserted or removed, support instability tends to be present. Vibration during the rotation of the disk also tends to occur. The accuracy of confocal observation deteriorates due to such instability and vibration.

SUMMARY OF THE INVENTION

This invention presents a tandem scanning confocal microscope with a structure which makes it possible to switch between confocal and normal observation modes with a fixed Nipkow disk position. The tandem scanning confocal microscope is composed of a confocal illumination light source, a scanning substrate (such as the Nipkow disk) which has many minute holes and on which the designated scanning operation is conducted, and a main optical system which causes the light from the confocal illumination light source to pass through the minute holes in the scanning substrate to irradiate the observation objective. After causing the light which is reflected by the observation objective to pass through the minute holes in a reverse direction, the microscope composes an enlarged image of the observation objective in the observation position.

A normal illumination light source is also provided. A bypass optical system directly irradiates the observation objective with the light from this normal illumination light source. The light reflected by the observation objective is led around the scanning substrate to the observation position and forms an enlarged image of the observation objective in the observation position.

The scanning substrate is composed of a disk which has many minute holes arranged in a spiral shape. It is possible to use a rotating Nipkow disk to carry out the scanning operation.

Again, a structure in which it is possible to freely insert the bypass optical system into or remove the bypass optical system from the main optical system is desirable. When confocal observation is conducted, the bypass optical system is separated from the main optical system. The bypass optical system is inserted into the main optical system when normal observation is conducted. As a result, during confocal observation, only the normal main optical system is used. By scanning the observation specimen with light which passes through the minute holes of the scanning substrate composed of a Nipkow disk or a similar element, microscopic observation is conducted. After the light from the normal illumination light source is irradiated onto the observation specimen during normal observation, reflected light is diverted around the scanning substrate and led to the observation position. Observation can then be conducted.

The bypass optical system can include a light path diverting structure placed in the light path between the observation objective and the scanning substrate in the main optical system. This structure leads the reflected light from the observation objective away from the light path of the main optical system. A light path return structure is placed in the light path between the scanning substrate and the observation position in the main optical system. The light path return structure leads light outside of the main optical system light path into the light path of the main optical system. A light path guiding structure leads the reflected light led out of the light path by the light path diverting structure to the light path return or recovery structure. In this case, the light path diverting structure and the light path recovery structure are freely movable between the normal observation position, which is located in the light path of the main optical system, and the confocal observation position, which is located away from the light path of the main optical system.

DESCRIPTION OF THE PREFERRED EMBODIMENT

Figure 1:
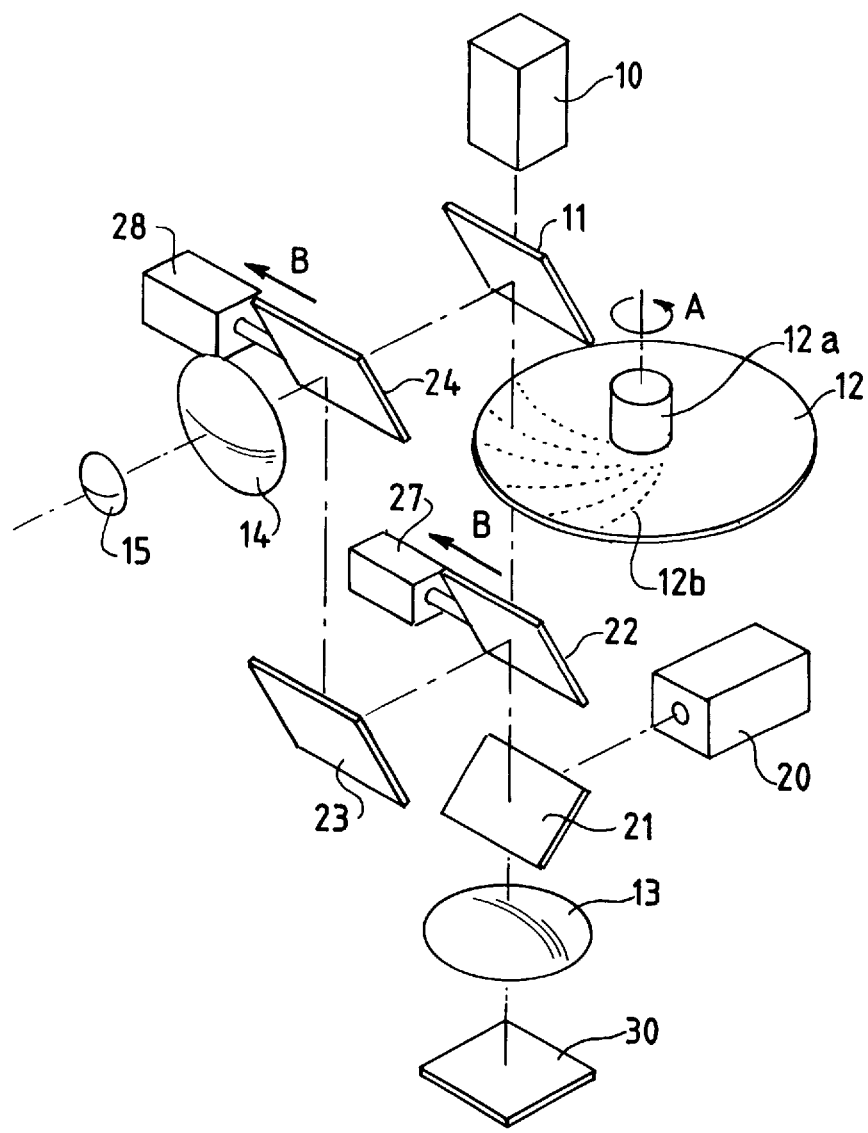
FIG. 1 is an exploded perspective view of the internal structure of a tandem scanning confocal microscope according to this invention.
Figure 2:
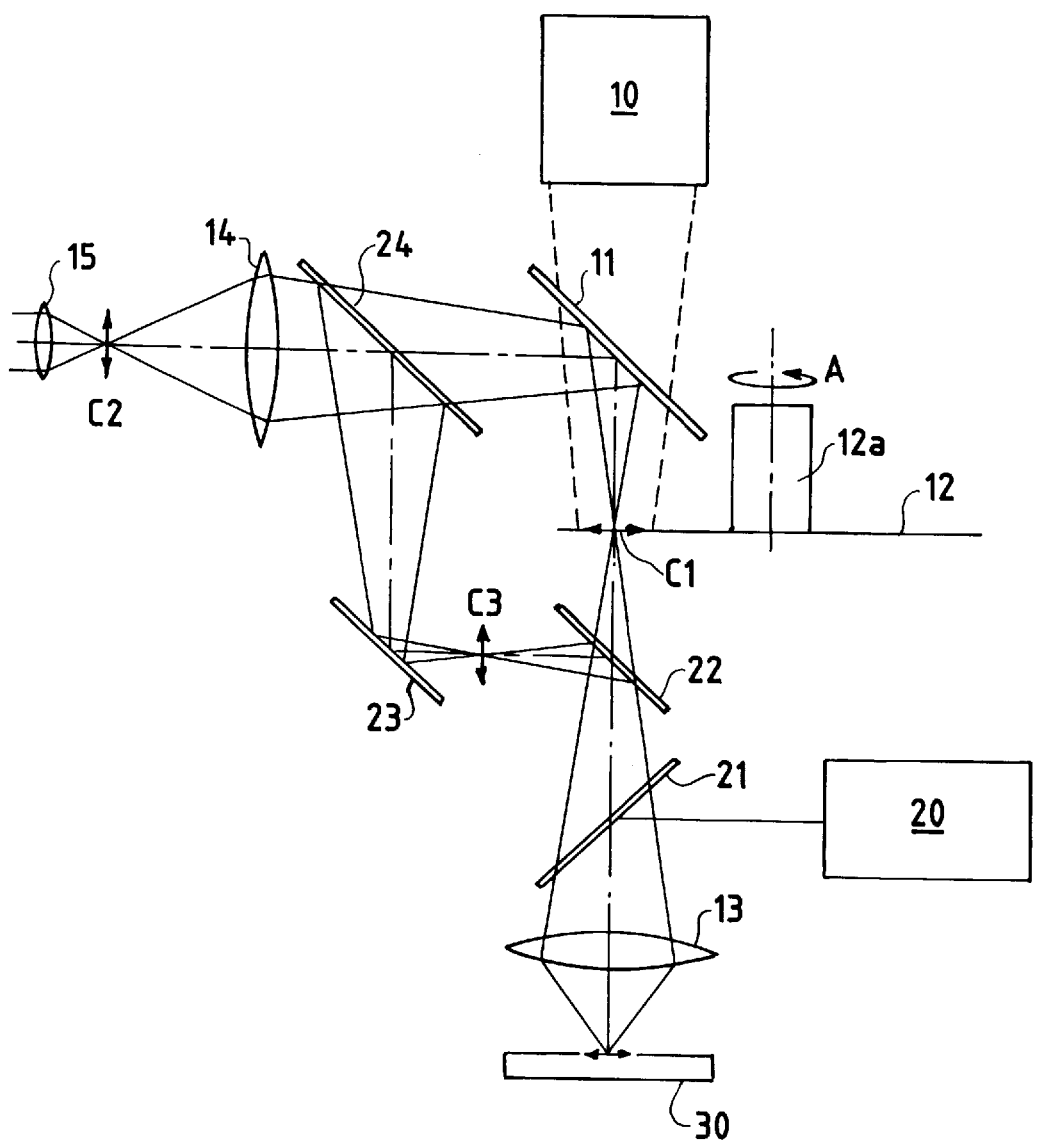
FIG. 2 is a frontal view of the tandem scanning confocal microscope shown in FIG. 1.
Figure 3:
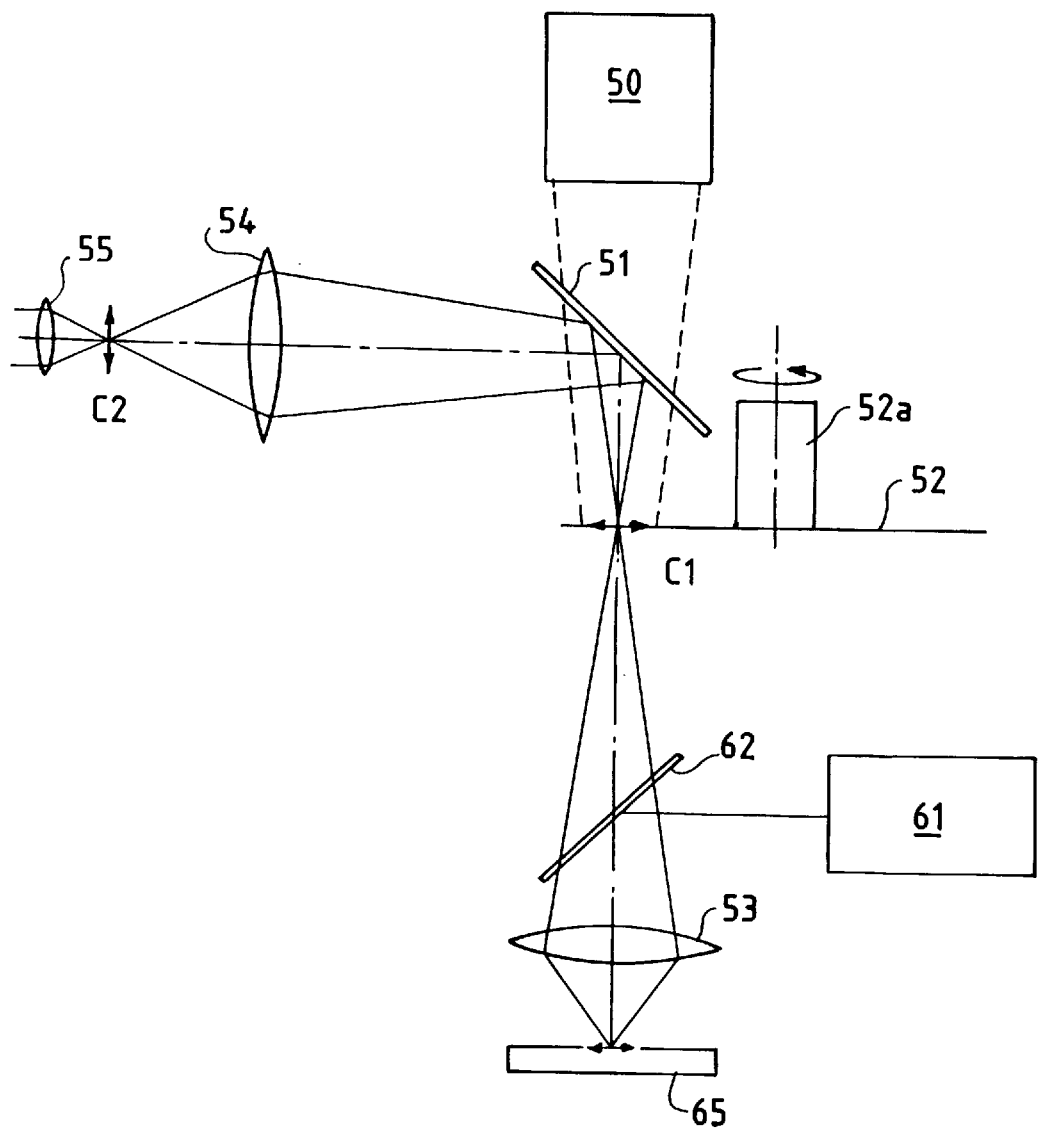
FIG. 3 as noted above, is a frontal view of a known tandem scanning confocal microscope.

FIGS. 1 and 2 show the tandem scanning confocal microscope which relates to this invention. This microscope is constructed by placing, inside the casing (not shown), a confocal illumination light source (10), a first half mirror (11), a Nipkow disk (12), an objective lens (13), a relay lens (14) and an ocular lens (15). These elements are oriented as shown in the drawings and form the main optical system.

Also disposed inside the casing are a normal illumination light source (20), a second half mirror (21), a first reflective mirror (22), a second reflective mirror (23) and a third reflective mirror (24). The light source (20) and the mirrors (21)–(24) are oriented as shown in FIGS. 1 and 2 and include the bypass optical system. The first and third reflective mirrors (22) and (24) are moveable in the directions indicated by an arrow (B). Actuators (27) and (28) produce movement of the mirrors (22) and (24). Operation of the actuators permits the first and third reflective mirrors to be freely moved between the normal observation position (the position shown in FIG. 1) in the light path of the main optical system and the confocal observation position outside of the light path.

The manner in which confocal observation is conducted will be explained first. When confocal observation is conducted, the first and third fully reflective mirrors (22) and (24) are moved to the confocal observation position by the actuators (27) and (28). In this condition, the light from the confocal illumination light source (10) passes through the first half mirror (11) and is irradiated onto the surface of the Nipkow disk (12).

The Nipkow disk (12) is a rotating disk which is driven by rotation of a shaft (12a) at its center. As shown in FIG. 1, many pinholes (12b) vertically pierce the disk (12) and define a pattern which spreads out in a spiral shape. A part of the pinhole pattern is shown in FIG. 1. In reality, however, the pinholes are formed in a spiral-shaped pattern over the entire surface of the disk.

The light which is irradiated onto the surface of the Nipkow disk (12) passes through the pinholes (12b), through the second half mirror (21) and through the objective lens (13). The light then is irradiated onto the observation specimen (30). The Nipkow disk (12) is placed in the primary image position (at focal point (c1)) of the observation specimen (30) by way of the objective lens (13) in this condition. As a result, the light which passes through the objective lens (13) and is irradiated onto the observation specimen (30) forms a pinhole image on the observation specimen (30). In FIG. 2, only one pinhole is shown. In reality, however, many pinholes (12b) are defined in the Nipkow disk (12) in the region in which the light from the confocal illumination light source (10) is irradiated. Each of these pinholes forms a pinhole image on the observation specimen (30).

The light which has been irradiated onto the observation specimen (30) in this way is reflected by the observation specimen. The light then passes through the objective lens (13) and the second half mirror (21) again, coming together at and passing through the original pinhole (12b). After being reflected by the first half mirror (11), the light passes through the relay lens (14) so that a second image of the observation specimen is composed at the focal point (c2). By looking through the ocular lens (15), confocal observation is possible.

With this kind of confocal observation, an enlarged image of the place which corresponds to the light from the many pinholes (12b), which is irradiated onto the observation specimen (30) as explained above, is simply composed into an image at the focal point (c2). It is only possible to observe an enlarged image which corresponds to several point positions instantaneously. However, the Nipkow disk (12) with the shaft (12a) at the center is being rotated. The pinhole light which is irradiated onto the observation specimen (30) scans over the observation specimen (30) as the rotation occurs. As a result, it is possible to record the second image at the focal point (c2) using a video camera through the ocular lens (15) and obtain an overall enlarged image (confocal observation image) of the observation specimen (30). Furthermore, it is possible to adjust a still camera so that the film surface is positioned at the focal point (c2) and to photograph the overall confocal observation image of the observation specimen (30).

Normal observation with this microscope will now be explained. When normal observation is conducted, the first and third fully reflective mirrors (22) and (24) are moved to the normal observation positions by the actuators (27) and (28). In this condition, the light from the normal illumination light source (20) is irradiated onto the second half mirror (21). Reflected light is made to pass through the objective lens (13) and is then irradiated onto the observation specimen (30).

The light which has been irradiated onto the observation specimen (30) is reflected by the observation specimen (30), and again passes through the objective lens (13) and the second half mirror (21). The light is then reflected by the first reflective mirror (22), which has been moved into the normal observation position, and led out of the light path of the main optical system. In other words, the first reflective mirror (22) operates as the light path diverting structure.

The light which is reflected by the first reflective mirror (22) combines the first image into the conjugate point (c3). The light is then irradiated onto the second reflective mirror (23), to change its direction, and onto the third reflective mirror (24). The third reflective mirror (24) is moved into the normal observation position and placed into the light path of the main optical system. The light which is irradiated onto the third reflective mirror (24) returns to the light path of the main optical system and passes through the relay lens (14). This relay lens (14) composes a second image of the observation specimen at the focal point (c2). The ocular lens

(15) permits observation of the overall enlarged image of the observation specimen so as to make normal observation possible. Furthermore, the second reflective mirror (23) acts as the light path guiding structure, and the third reflective mirror (24) acts as the light path recovery structure.

As explained above, with this tandem scanning confocal microscope, by simply moving the first and third reflective mirrors (22) and (24) which compose the bypass optical system, the position of the Nipkow disk (12) can remain fixed. As a result, it is possible to place the pinhole formation surface of the Nipkow disk (12) accurately in the first image position (focal position). This makes superior confocal observation possible.

This embodiment is structured so that the first and third reflective mirrors (22) and (24) are moved by actuators (27) and (28). It is also possible to construct the microscope so that the two mirrors (22) and (24) are joined together as a unit and are moved by one actuator. It is further possible to make the microscope so that, without using an actuator, the two mirrors are manually movable from outside of the microscope. Furthermore, prisms may also be used in place of the reflective mirrors.

The tandem scanning confocal microscope is composed of both the main optical system and the bypass optical system. The main optical system bypasses the light from the confocal illumination light source through the minute holes of the scanning substrate (for example, a Nipkow disk), irradiates it onto the observation objective, and, after causing the light reflected from the observation specimen to pass in reverse through the minute holes, composes an enlarged image of the observation objective in the observation position. The bypass optical system directly irradiates the observation objective with the light from the normal illumination light source, leads the light reflected from the observation objective around the scanning substrate to the observation position, and composes an enlarged image of the observation objective in the observation position. When normal observation is conducted, the bypass optical system, which bypasses the scanning substrate, can be used, and the position of the scanning substrate can be fixed. As a result, it is possible to adjust the pinhole formation position of the scanning substrate (Nipkow disk) accurately in the primary image position (focal position). As noted above, a superior confocal observation is continually made possible in this way.

The bypass optical system is ideally constructed so that it can be freely inserted into or removed from the main optical system. When confocal observation is conducted, the bypass optical system is simply separated from the main optical system. When normal observation is conducted, the bypass optical system can be installed in the main optical system. The observation mode can be easily changed in this way.

What is claimed is:

1. A tandem scanning confocal microscope comprising:
    a confocal illumination light source which irradiates confocal light for observation,
    a scanning substrate with which a designated scanning action is accomplished using many minute holes,
    a main optical system which irradiates light from the confocal illumination light source and causes it to pass through the minute holes in the scanning substrate and illuminate an observation objective, said main optical system, after causing light which is reflected from the observation objective to pass through the minute holes, composing an enlarged image of the observation objective at the observation position,
    a normal illumination light source which irradiates light for normal observation, and
    a bypass optical system which directly irradiates the light from the normal illumination light source onto the observation objective, said bypass optical system leading the light which is reflected from the observation objective around the scanning substrate to the observation position and composing the enlarged image of the observation objective at the observation position.

2. The tandem scanning confocal microscope defined in claim 1 wherein the scanning substrate is a Nipkow disk constructed from a disk which has many minute holes arranged in a spiral shape and accomplishes its scanning action by rotation.

3. The tandem scanning confocal microscope defined in claim 1 wherein the bypass optical system-includes elements which are freely inserted into or removed from the main optical system, when observation is conducted with light from the confocal illumination light source, the elements of the bypass optical system are separated from the main optical system, and when observation is conducted with light from the normal illumination light source, the elements of the bypass optical system are installed into the main optical system.

4. The tandem scanning confocal microscope defined in claim 1 wherein the bypass optical system includes a light path diverting structure which is placed in the light path between the observation objective and the scanning substrate in the main optical system and which leads the light which is reflected from the observation objective out of the light path of the main optical system, a light path recovery structure which is placed in the light path between the scanning substrate and the observation position in the main optical system and which leads light from outside of the path into the light path of the main optical system, and a light path guiding structure which leads the reflected light which has been led out of the light path by the light path diverting structure to the light path recovery structure, the light path diverting structure and the light path recovery structure being freely moved between a normal observation position which is positioned in the light path of the main optical system and a confocal observation position which is positioned away from the light path of the main optical system.

5. The tandem scanning confocal microscope defined in claim 2 wherein the bypass optical system includes elements which are freely inserted into or removed from the main optical system, when observation is conducted with light from the confocal illumination light source, the elements of the bypass optical system are separated from the main optical system, and when observation is conducted with light from the normal illumination light source, the elements of the bypass optical system are installed into the main optical system.

6. The tandem scanning confocal microscope defined in claim 2 wherein the bypass optical system includes a light path diverting structure which is placed in the light path between the observation objective and the scanning substrate in the main optical system and which leads the light which is reflected from the observation objective out of the light path of the main optical system, a light path recovery structure which is placed in the light path between the scanning substrate and the observation position in the main optical system and which leads light from outside of the path into the light path of the main optical system, and a light path guiding structure which leads the reflected light which has been led out of the light path by the light path diverting structure to the light path recovery structure, the light path diverting structure and the light path recovery structure being freely moved between a normal observation position which is positioned in the light path of the main optical system and a confocal observation position which is positioned away from the light path of the main optical system.

7. The tandem scanning confocal microscope defined in claim 3 wherein the bypass optical system includes a light path diverting structure which is placed in the light path between the observation objective and the scanning substrate in the main optical system and which leads the light which is reflected from the observation objective out of the light path of the main optical system, a light path recovery structure which is placed in the light path between the scanning substrate and the observation position in the main optical system and which leads light from outside of the path into the light path of the main optical system, and a light path guiding structure which leads the reflected light which has been led out of the light path by the light path diverting structure to the light path recovery structure, the light path diverting structure and the light path recovery structure being freely moved between a normal observation position which is positioned in the light path of the main optical system and a confocal observation position which is positioned away from the light path of the main optical system.

8. The tandem scanning confocal microscope defined in claim 3, wherein said elements are reflective mirrors.

9. The tandem scanning confocal microscope defined in claim 5, wherein said elements are reflective mirrors.

10. The tandem scanning confocal microscope defined in claim 4, wherein each of said light path diverting structure, said light path recovery structure and said light path guiding structure includes a reflective mirror.

11. The tandem scanning confocal microscope defined in claim 4, wherein said bypass optical system further includes actuators for moving the light path diverting structure and the light path recovery structure into and out of the light path.

12. The tandem scanning confocal microscope defined in claim 11, wherein said light path guiding structure is stationary.

13. The tandem scanning confocal microscope defined in claim 7, wherein each of said light path diverting structure, said light path recovery structure and said light path guiding structure includes a reflective mirror.

14. A tandem scanning confocal microscope comprising:
    a confocal illumination light source which irradiates confocal light for observation of an observation objective,
    a scanning substrate with which a designated scanning action is accomplished using many minute holes,
    a normal illumination light source which irradiates light for normal observation of the observation objective, and
    a pair of elements movable into and out of a light path between the observation objective and an observation position in order to selectively bypass said scanning substrate during observation of the observation objective.

15. The tandem scanning confocal microscope defined in claim 14 wherein the scanning substrate is a Nipkow disk constructed from a disk which has many minute holes arranged in a spiral shape and accomplishes its scanning action by rotation.

16. The tandem scanning confocal microscope defined in claim 14, and further comprising actuators for moving the pair of elements into and out of the light path.

17. The tandem scanning confocal microscope defined in claim 15, and further comprising actuators for moving the pair of elements into and out of the light path.

18. The tandem scanning confocal microscope defined in claim 14, wherein each of said elements is a reflective mirror.

19. The tandem scanning confocal microscope defined in claim 15, wherein each of said elements is a reflective mirror.

20. The tandem scanning confocal microscope defined in claim 14, and further comprising a stationary reflective mirror for guiding light from one of said pair of elements to the other.

* * * * *